US012559232B2

(12) United States Patent
Vander Lind

(10) Patent No.: US 12,559,232 B2
(45) Date of Patent: Feb. 24, 2026

(54) ELECTRIC VERTICAL TAKEOFF AND LANDING AIRCRAFT

(71) Applicant: Ampaire Inc., Hawthorne, CA (US)

(72) Inventor: Damon Vander Lind, Hayward, CA (US)

(73) Assignee: Ampaire Inc., Hawthorne, CA (US)

( * ) Notice: Subject to any disclaimer, the term of this patent is extended or adjusted under 35 U.S.C. 154(b) by 0 days.

(21) Appl. No.: 17/828,760

(22) Filed: May 31, 2022

(65) Prior Publication Data

US 2022/0380037 A1 Dec. 1, 2022

Related U.S. Application Data

(60) Provisional application No. 63/195,086, filed on May 31, 2021.

(51) Int. Cl.
| | |
|---|---|
| *B64C 29/00* | (2006.01) |
| *B64D 27/24* | (2024.01) |
| *B64D 27/31* | (2024.01) |
| *B64D 27/34* | (2024.01) |
| *B64D 31/16* | (2024.01) |

(52) U.S. Cl.
CPC ...... *B64C 29/0025* (2013.01); *B64C 29/0033* (2013.01); *B64D 27/31* (2024.01); *B64D 27/34* (2024.01); *B64D 31/16* (2024.01)

(58) Field of Classification Search
CPC ........................ B64C 29/0033; B64C 29/0025
See application file for complete search history.

(56) References Cited

U.S. PATENT DOCUMENTS

| | | | | |
|---|---|---|---|---|
| 3,185,408 | A * | 5/1965 | Higgins | .............. B64C 29/0033 |
| | | | | 244/7 R |
| 5,419,514 | A * | 5/1995 | Ducan | ................. B64C 29/0033 |
| | | | | 244/23 B |
| 7,874,513 | B1 * | 1/2011 | Smith | .................... B64C 11/001 |
| | | | | 244/12.4 |
| 2010/0301168 | A1 * | 12/2010 | Raposo | ................... B64C 27/82 |
| | | | | 244/171.2 |
| 2018/0215465 | A1 * | 8/2018 | Renteria | ................. B64C 27/02 |
| 2020/0094938 | A1 * | 3/2020 | Seibel | ........................ B64C 1/16 |
| 2021/0086893 | A1 * | 3/2021 | Zimenskaya | ........... B64C 39/08 |
| 2022/0009626 | A1 * | 1/2022 | Baharav | ................. B64D 27/24 |
| 2022/0242557 | A1 * | 8/2022 | Knoll | ..................... B64C 27/28 |
| 2022/0281593 | A1 * | 9/2022 | Stobbe | ..................... B64D 27/24 |
| 2022/0281614 | A1 * | 9/2022 | Jeng | ........................ B64C 25/56 |
| 2022/0324558 | A1 * | 10/2022 | Ross | ........................ B64D 27/33 |
| 2022/0355923 | A1 * | 11/2022 | Andrews | ............... B64D 27/24 |
| 2023/0234703 | A1 * | 7/2023 | Brown | .................... B64C 11/04 |
| | | | | 244/7 R |

* cited by examiner

*Primary Examiner* — William L Gmoser
(74) *Attorney, Agent, or Firm* — Sterne, Kessler, Goldstein & Fox P.L.L.C.

(57) ABSTRACT

An electric vertical takeoff and landing (EVTOL) aircraft is disclosed. In some aspects, the aircraft comprises a main wing, an empennage, two lift propulsors, and two lift/thrust propulsors each mounted on a tilt axis.

8 Claims, 3 Drawing Sheets

ELECTRIC VERTICAL TAKEOFF AND LANDING AIRCRAFT

RELATED APPLICATION

This application claims priority to U.S. Provisional Application No. 63/195,086, filed on May 31, 2021, which is incorporated herein by reference in its entirety.

DETAILED DESCRIPTION

Figure 1A:
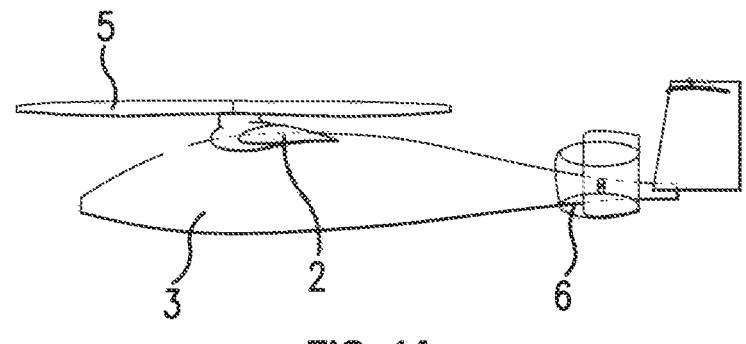
FIGS. 1A-1C are side, front, and top views of an aircraft according to an aspect.

A detailed description of embodiments of the invention is provided below, along with accompanying figures. The invention is described in connection to such embodiments, but is not limited to any specific described embodiment. The scope of the invention is only limited by the claims and the invention encompasses numerous alternate embodiments. A number of specific details are set forth below in order to provide a thorough understanding of the invention. These details are provided for the purpose of example and the invention may be practiced according to the claims without some or all of these specific details.

The invention can be implemented in numerous ways, including as a process, apparatus, or system. In whatever form the invention may take, it may be referred to as techniques.

An electric vertical takeoff and landing (EVTOL) aircraft is disclosed. In some aspects, the aircraft comprises a main wing, an empennage, two lift propulsors, and two lift/thrust propulsors each mounted on a tilt axis. Each propulsor is powered by multiple electric motor/controller pairs, which are powered by multiple battery systems so as to provide the required reliability and redundancy for safe vertical takeoff and landing. The aircraft comprises landing gear, such as wheeled landing gear or skids. The aircraft is capable of horizontal landing and in some aspects is capable of a horizontal takeoff. The tail lift/thrust propellers are mounted with an angled axis such that the thrust is predominantly in the forward direction along the X body axis when in forward flight (horizontal thrust) mode, and the thrust is angled, in some embodiments outward from the centerline of the aircraft, when the propellers are in the predominantly vertical position.

In general for EVTOL aircraft, it is challenging to balance the need for low power and low torque levels in hover, with the need for low mass in hover, high battery mass fraction, and low drag in cruise. This is especially true once the reliability and redundancy of various systems on the vehicle are taken into consideration. Often, design features that achieve lower drag result in higher hover power requirements, or substantially higher mechanical complexity. For example, a smaller set of rotors can be used on a tiltrotor system which will reduce wetted area in cruise, but increase power in hover. For another example, a variable pitch tiltrotor can result in higher efficiency than fixed pitch rotor systems, but require more moving parts. The aircraft described herein achieves a more beneficial solution to these design constraints through the appropriate combination of large, low disc loading propulsors attached to the leading edge of the wing, and smaller, higher disc loading lift/thrust propulsors that provide a minority of the lift in hover, and transition to providing the thrust required in cruise flight. The lift propulsors can be attached to the leading edge of the main wing and can include two blades, while the lift-thrust propulsors can be mounted either on or near the empennage or tailcone of the aircraft. The lift propulsors can be stopped in cruising flight, with the blades pointing predominantly into/away from the wind for reduced drag. In an aspect, the lift/thrust propulsors can be ducted fans. In another aspect, the lift/thrust propulsors can be open rotors that have sufficiently high solidity to be able to operate in both hovering and forward cruise flight.

One of the challenges in EVTOL hover is yaw control, on top of the allotment of appropriate pitch and roll control, which are provided on top of the application of sufficient thrust to hover or accelerate against gravity. The lift/thrust propulsors are mounted on a pivot with a dihedral angle to the horizontal so that there is a cant angle from the vertical on the lift/thrust propulsors when they are in lift position. This cant angle means that they provide both a yawing moment and a thrust when more torque is applied. Because the two lift/thrust propulsors are relatively near each other, one may be throttled up and the other throttled down in order to provide a large yawing moment on the vehicle, with only a minor change in thrust required on the other propulsors to hold an equal rolling moment.

In an alternate aspect, the two tilting lift-thrust propulsors on the rear of the aircraft can be replaced with a single propulsor, coupled with a steering vane, to provide thrust and vehicle yawing moment near the tail when in hover. As in some cases EVTOL aircraft can carry substantial fixed structure in order to achieve favorable placement of lift or lift/thrust propulsors, the aircraft described herein may offer some improvement through the use of existing and required structure in the wing and tail to hold the lift and lift/thrust propulsors with less extensive need for reinforcements.

Figure 1B:
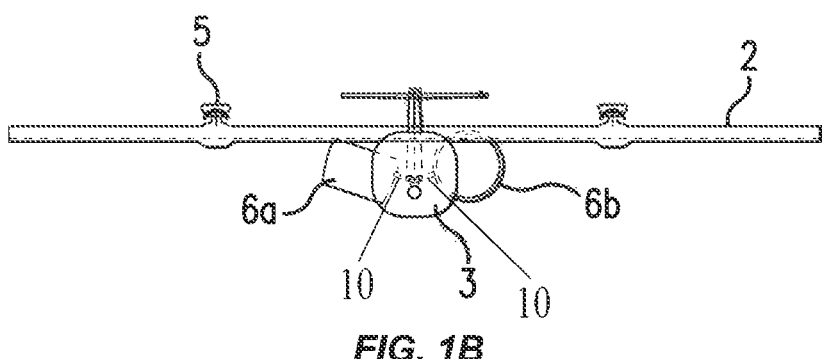
Figure 1C:
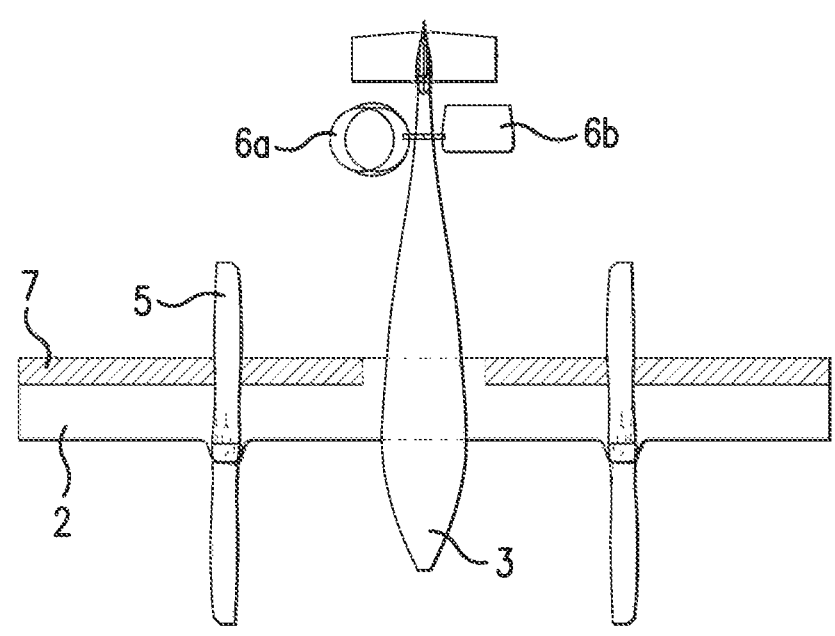

FIGS. 1A-1C depict an EVTOL aircraft, in which a fuselage (3), is connected to a main wing (2), which has large lift propulsors (5) mounted on it's leading edge, as well as trailing edge control surfaces (7), which are deflected down to both reduce drag coefficient and blockage area under the front propulsors while in hover or low speed transitional flight, while also increasing maximum lift coefficient as well as lift coefficient at a given incidence. On the tail boom of the aircraft are mounted two rear lift/thrust propulsors (6a, 6b), which are mounted at a dihedral angle on the fuselage on pivot axes (10) which are actuated by tilt actuators, such that their thrust is angled outward from the centerline of the aircraft when in a hover orientation. In this aspect, the disc loading of the front lift propulsors (5) is substantially higher than that of the rear lift/thrust propulsors (6), which allows for implementation with fully fixed pitch lift/thrust propulsors that are able to operate unstalled both in hover and transitional flight, as well as in fully wing-borne cruise flight. In some embodiments, the lift/thrust propulsors are ducted fans, which can further increase the efficiency of the system when disc loading is high, and/or reduces the variation in RPM of the propulsor between hover and high speed cruise flight for a given disc loading. Ducted fans can often be designed so as to have a higher efficiency at a given disc loading, to be quieter at a given disc loading, and to have less RPM variation between hover and cruising flight when compared to an open rotor such as a conventional fixed pitch propeller. Ducted fans, however, can have increased mass and increased wetted area at lower disc loadings. This makes a ducted fan with a higher disc loading, in some embodiments between 750 and 5000 N/m^2, coupled to lift propulsors that have a disc loading in some embodiments of between 250 and 750 N/m^2, a potential optimal range for efficient flight without variable pitch propulsors. In some embodiments, the lift/thrust propulsors comprise a highly strengthened propeller that is designed to withstand a design-case bird strike, and to be a safety and flight critical item. In other embodiments, the lift-thrust propulsors are designed with sufficient thrust margin to be able to make a conventional aircraft landing on landing gear or skids in the case of a bird strike on one of the two lift-thrust propulsors. In some embodiments the lift/thrust propulsors are variable pitch, and the benefit of fixed pitch simplicity is given up, saving only the benefit of reduced wetted area in cruise without additional hardware systems.

Figure 2:
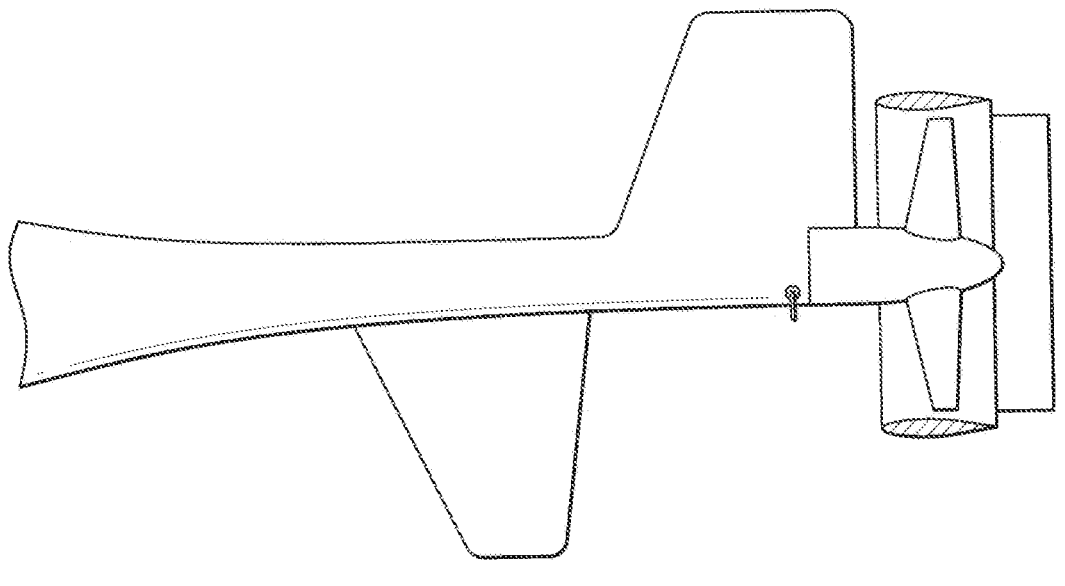
FIG. 2 is a side view of a portion of an aircraft according to an aspect.

FIG. 2 depicts an alternate embodiment, in which a single rear propulsor is used, along with a steering vane that is supported behind the single rear propulsor. In this embodiment, reliability against a design-case bird strike, if required, is provided through the application of a sufficiently strong propeller. This embodiment may be utilized in cases in which it is favorable to ingest and re-accelerate the boundary layer of the fuselage, possibly at the cost of some cruise propulsion separation of systems. In some further versions of this alternate embodiment, yaw control is applied through the application of a yawing actuator, which is able to yaw the propeller, in addition to the tilting actuator that is able to tilt the propeller.

Figure 3:
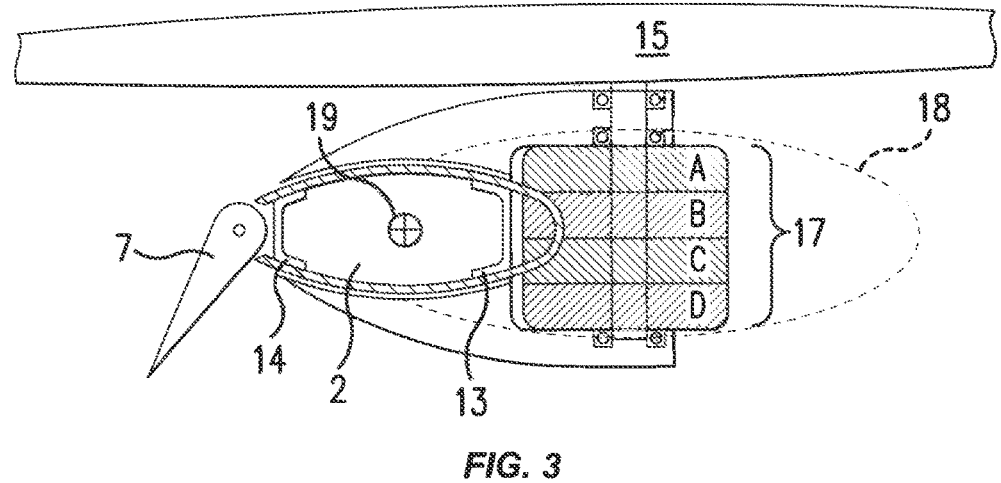
FIG. 3 is a detail view of a lift motor according to an aspect.

FIG. 3 is a diagram depicting an embodiment, in which the lift propulsors (5) are mounted in front of the main wing (2), in front of the main-wing spar (13). The propulsor in this embodiment comprises four separate electric motors (A,B, C,D) that together comprise the electric motor (17). Each electric motor 17 is able to provide torque to the primary axle of the propulsor, which may be protected by some means from applying negative torque to the axle, as would be required in certain feasible failure cases of the electric motor or motor controller.

The mounting of the electric motor in front of the wing spar allows for a continuous and uninterrupted wing spar, while placing the center of thrust, in particular the center of thrust when accounting for rotor blockage, in front of the vehicle center of gravity (19) such that there is an appropriate balance between the lift propulsors (5) and the lift/ thrust propulsors (6). For example, in some embodiments, the lift/thrust propulsors may be responsible for ½ or ¼ as much thrust as the lift propulsors while the aircraft is in hover. In general, this is implemented with a minority of thrust provided by the lift/thrust propulsors as they are not as efficient in hover, and increasing the size of the propulsor to reduce power use in hover would reduce cruise efficacy. In some embodiments the propellers of the lift propulsors are mounted about the wing so as to provide increased clearance to the ground and any potential occupant path. In other embodiments, the propellers of the lift propulsors are mounted below the wing so as to reduce rotor blockage in hover and reduce power and torque requirements on the motor. The trailing control surface (7) is deflected downward in hover so as to reduce blockage in hover. In some embodiments, the rear wing spar (14) is placed as far forward as is appropriate for wing stiffness, so as to allow for as large a trailing control surface (7) as is practicable. A fairing (18) can be placed over the motor and structural assembly so as to reduce drag in forward flight. The propeller (15) may be placed above the wing (2) or below the wing.

Figure 4:
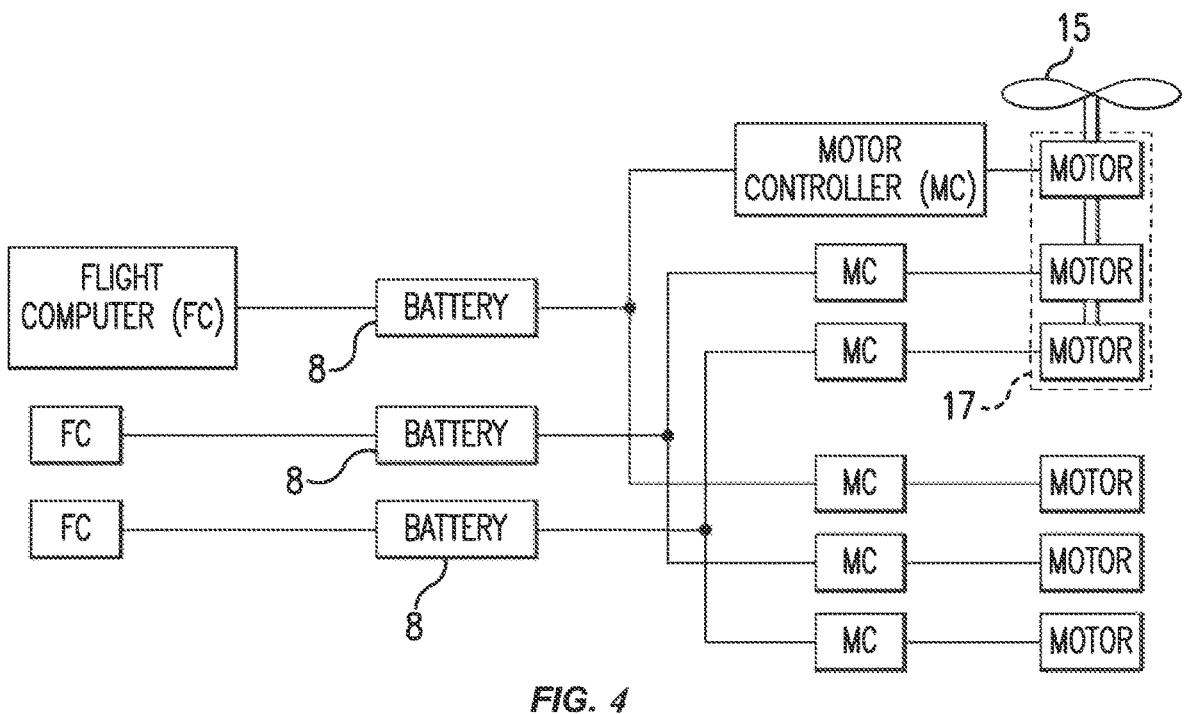
FIG. 4 is a schematic view of a power and propulsion architecture according to an aspect.

FIG. 4 is a schematic depicting an embodiment in which flight computers (FC) control sets of batteries (8) and motor controllers (MC). For brevity, propulsor 17 is shown, but in the actual implementation all propulsors would be included. In this embodiment, each flight computer is a low level flight computer providing primary stabilization of the aircraft based on inputs, and may also take commands from a flight computer or set of redundant flight computers at a higher level which may follow some other architecture. In some embodiments this configuration of flight computers isn't used, but the configuration of power systems, in which multiple parallel power busses provide for all propulsors, is used with some other flight computer configuration.

As shown in FIG. 4, each flight computer is architected in a "fail off" manner, either through multiple parallel lines of processing, or through the inclusion of a monitor of some sort, so that the failure case of the flight computer. Similarly, each battery and motor controller includes any necessary monitors, sensing, and parallel processing that a fail-on condition or failure to a random command can be considered sufficiently improbable to have negligible impact on the safety of flight.

In some embodiments another number of redundant units (for example 2 or 4) can be included with each propulsor, while in FIG. 4 depicts three redundant units. In some alternate E-VTOL aircraft design, disc area is lost due to failures that are not extremely improbable. However, in this invention disc area is not lost, and total thrust out of a propulsor post failure need not change.

There are various other options for this invention. For example, it is possible to mount the lift/thrust propulsors with anhedral angle instead of dihedral angle, This would still achieve the required yaw authority in hover.

In some aspects, the lift/thrust propulsors are two coaxial rotors in the same fan fairing or on the same tilt mount.

In some aspects tilt can be controlled by a fail-off actuator, and in the case of an actuator failure, landing must be performed in the speed envelope of the given tilt angle at which the failure occurs. For example, an actuator failure midway in the transition from hover to cruise flight may result in a limited flight envelope, with airspeeds between, for example, about half of stall speed of the aircraft, and stall speed of the aircraft. In other aspects, the tilt of the lift/thrust propulsors is controlled by a fail-operational actuator, such that complete transition or detransition of the aircraft from hover to cruise flight and back again is possible after an actuator failure.

What is claimed is:

1. An electric vertical takeoff and landing aircraft comprising:

a main wing and a fuselage;

two fixed front lift propellers attached to a leading edge of the main wing between a root of the main wing and a tip of the main wing;

two rear lift/thrust propulsors pivotably attached to the fuselage, each of the rear lift/thrust propulsors being mounted on a tilt axis to provide thrust predominantly in the direction of flight while in a horizontal position and to provide thrust downward and outward from a centerline of the aircraft when in a vertical hover position; and a control system configured to apply different thrusts to each of the rear lift/thrust propulsors when the rear lift/thrust propulsors are in a lift position to achieve a yaw command, and to apply compensating thrusts to each of the front lift propulsors to maintain pitch and roll control, wherein the front lift propellers have a larger swept area than the rear lift/thrust propulsors; and the rear lift/thrust propulsors are closer to the centerline of the aircraft than the front lift propellers.

2. The aircraft of claim 1, wherein the lift/thrust propulsors are mounted at a dihedral or anhedral angle.

3. The aircraft of claim 1, wherein the lift/thrust propulsors are ducted fans.

4. The aircraft of claim 1, wherein the lift propellers comprise three sets of motor/controllers on a common driveshaft.

5. The aircraft of claim 1, wherein of the lift propellers are mounted above the main wing.

6. The aircraft of claim 1, wherein the lift propellers are mounted below the main wing.

7. The aircraft in claim 1, wherein the rear lift/thrust propulsors are ducted fans and are capable of operating without significant stall in both hover conditions and cruise conditions with the aircraft travelling at greater than or equal to approximately 100 miles per hour.

8. The aircraft of claim 1, wherein the lift propellers are stopped in a low drag orientation in cruise.

* * * * *